US012649467B2

(12) United States Patent
Abroshan et al.

(10) Patent No.: US 12,649,467 B2
(45) Date of Patent: Jun. 9, 2026

(54) SYSTEM AND METHOD FOR PREVENTING TRAILER SWAY

(71) Applicant: GM GLOBAL TECHNOLOGY OPERATIONS LLC, Detroit, MI (US)

(72) Inventors: Mehdi Abroshan, Waterloo (CA); Mohammadali Shahriari, Markham (CA); Zhi Li, Unionville (CA); Christopher G. Woischwill, Bowmanville (CA); Kin Man Michael Wong, Thornhill (CA); Puneet Bagga, Etobicoke (CA); Kevin A. O'Dea, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 137 days.

(21) Appl. No.: 18/655,825

(22) Filed: May 6, 2024

(65) Prior Publication Data

US 2025/0340204 A1     Nov. 6, 2025

(51) Int. Cl.
| | |
|---|---|
| *B60W 30/02* | (2012.01) |
| *B60D 1/30* | (2006.01) |
| *B60W 30/14* | (2006.01) |
| *B60W 30/16* | (2020.01) |
| *B60W 30/18* | (2012.01) |

(Continued)

(52) U.S. Cl.
CPC .......... *B60W 30/146* (2013.01); *B60W 30/16* (2013.01); *B60W 50/14* (2013.01); *B60W 2050/146* (2013.01); *B60W 2300/14* (2013.01); *B60W 2510/225* (2013.01); *B60W 2520/10* (2013.01); *B60W 2540/18* (2013.01); *B60W 2552/15* (2020.02); *B60W 2554/80* (2020.02)

(58) Field of Classification Search
CPC .... B60W 30/146; B60W 30/16; B60W 50/14; B60W 2552/15; B60W 2554/80; B60W 2050/146; B60W 2300/14; B60W 2510/225; B60W 2520/10; B60W 2540/18
See application file for complete search history.

(56) References Cited

U.S. PATENT DOCUMENTS

| | | | |
|---|---|---|---|
| 2007/0032913 A1* | 2/2007 | Ghoneim | B60W 40/10 |
| | | | 701/1 |
| 2013/0253814 A1* | 9/2013 | Wirthlin | B60D 1/62 |
| | | | 701/1 |

(Continued)

FOREIGN PATENT DOCUMENTS

| | | |
|---|---|---|
| DE | 19964048 A1 | 1/2001 |
| DE | 102011010994 A1 | 8/2012 |
| DE | 102020131135 A1 | 5/2022 |

*Primary Examiner* — Scott A Browne
*Assistant Examiner* — Rami Nabih Bedewi
(74) *Attorney, Agent, or Firm* — Quinn IP Law

(57) ABSTRACT

A method of operating a tow vehicle and a trailer to prevent trailer sway. The method includes detecting a predetermined maneuver for the tow vehicle and the trailer based on operating parameters. The predetermined maneuver corresponds to a subset of operating parameters from the plurality of operating parameters. A critical speed is determined based on the subset of operating parameters. The critical speed corresponds to a speed of the tow vehicle and trailer where a damping between the tow vehicle and the trailer cannot prevent trailer sway. A vehicle control is adjusted for the tow vehicle based on the critical speed.

20 Claims, 5 Drawing Sheets

(51) Int. Cl.
    *B60W 40/00*      (2006.01)
    *B60W 50/14*      (2020.01)

(56)                  References Cited

U.S. PATENT DOCUMENTS

| | | | |
|---|---|---|---|
| 2017/0011562 A1* | 1/2017 | Hodges | G09B 29/007 |
| 2020/0079164 A1* | 3/2020 | Finan | G06T 7/80 |
| 2022/0203999 A1* | 6/2022 | Lin | B60D 1/30 |
| 2024/0132054 A1* | 4/2024 | Weston | B60W 30/02 |
| 2024/0270234 A1* | 8/2024 | Weston | B60W 30/02 |

* cited by examiner

200

201 Start

202 Initial conditions met ? — No → 204 End

Yes

206 Trailer articulated for $t > t_{min}$ ? — No

Yes

208 Trailer sway detected ? — No

Yes

210 $v_x > v_x^{crt}$ ? — No

212 $v_x < v_x^{crt}$ ? — No

Yes

214 Update critical speed

SYSTEM AND METHOD FOR PREVENTING TRAILER SWAY

INTRODUCTION

The present disclosure relates to towing a trailer with a tow vehicle and, more particularly, to preventing the trailer from swaying relative to the tow vehicle.

A driver of a tow vehicle can encounter several obstacles when towing a trailer. Additionally, towing a trailer can change the dynamics of the tow vehicle and lead the driver of the tow vehicle to operate the vehicle differently due to the increase in length of the tow vehicle and the trailer combined. Furthermore, the trailer can sway or oscillate relative to the tow vehicle during certain operating conditions making the trailer more difficult to control.

SUMMARY

Disclosed herein is a method of operating a tow vehicle and a trailer to prevent trailer sway. The method includes detecting a predetermined maneuver for the tow vehicle and the trailer based on operating parameters. The predetermined maneuver corresponds to a subset of operating parameters from the plurality of operating parameters. A critical speed is determined based on the subset of operating parameters. The critical speed corresponds to a speed of the tow vehicle and trailer where a damping between the tow vehicle and the trailer cannot prevent trailer sway. A vehicle control is adjusted for the tow vehicle based on the critical speed.

In another aspect of the disclosure adjusting the vehicle control for the tow vehicle includes operating the tow vehicle at an operating speed less than the critical speed.

In another aspect of the disclosure operating the tow vehicle at a speed less than the critical speed includes limiting a speed for an adaptive cruise control system on the tow vehicle.

In another aspect of the disclosure adjusting the vehicle control for the tow vehicle includes varying a spacing between the tow vehicle and another vehicle on a roadway based on the critical speed.

In another aspect of the disclosure the method includes displaying the critical speed to an operator of the tow vehicle.

In another aspect of the disclosure the method includes alerting to the operator of the tow vehicle if a tow vehicle speed is within a predetermined range of the critical speed.

In another aspect of the disclosure the predetermined maneuver includes a steering angle of the tow vehicle more than a predetermined threshold angle and determining the critical speed is based at least partially on a trailer wheelbase.

In another aspect of the disclosure the predetermined maneuver includes the tow vehicle and the trailer operating above a predetermined threshold speed for a predetermined length of time.

In another aspect of the disclosure the subset of operating parameters includes a road grade of a roadway and determining the critical speed is based on the road grade of the roadway.

In another aspect of the disclosure the method includes calculating a trailer damping for the trailer relative to the tow vehicle and determining if the trailer damping is below a predetermined damping threshold or the critical speed is above a predetermined critical speed. The method also includes alerting an operator of the tow vehicle of a longitudinal trailer payload imbalance if at least one of the trailer damping is below a predetermined damping threshold or the critical speed is above a predetermined critical speed and providing a longitudinal payload adjustment recommendation.

In another aspect of the disclosure the method includes calculating a first estimated critical speed and a first damping between the tow vehicle and the trailer based on a first predetermined lateral maneuver of the tow vehicle including a first steering angle above a predetermined threshold in a first direction. The method also includes calculating a second estimated critical speed and a second damping between the tow vehicle and the trailer based on a second predetermined lateral maneuver of the tow vehicle including a second steering angle above a second predetermined threshold in a second direction opposite the first direction. The method also includes determining if a critical speed variation between the first estimated critical speed and the second estimated critical speed exceeds a predetermined threshold and determining if a damping variation between the first damping exceeded and the second damping exceeds a predetermined threshold. The method also includes alerting an operator of the tow vehicle to a lateral load imbalance if at least one of the critical speed variation exceeds the predetermined threshold or the damping variation drops below the predetermined threshold.

Disclosed herein is a non-transitory computer-readable storage medium embodying programmed instructions which, when executed by a processor, are operable for performing a method. The method includes detecting a predetermined maneuver for the tow vehicle and the trailer based on operating parameters. The predetermined maneuver corresponds to a subset of operating parameters from the plurality of operating parameters. A critical speed is determined based on the subset of operating parameters. The critical speed corresponds to a speed of the tow vehicle and trailer where a damping between the tow vehicle and the trailer cannot prevent trailer sway. A vehicle control is adjusted for the tow vehicle based on the critical speed.

Disclosed herein is a vehicle. The vehicle includes a body defining a passenger compartment, wheels supporting the body, sensors fixed relative to the body and a controller in communication with the sensors. The controller being configured to detect a predetermined maneuver for a tow vehicle and a trailer based on operating parameters. The predetermined maneuver corresponds to a subset of operating parameters from the plurality of operating parameters. The controller is also configured to determine a critical speed based on the subset of operating parameters with the critical speed corresponding to a speed of the tow vehicle and trailer where a damping between the tow vehicle and the trailer cannot prevent trailer sway. The controller is further configured to adjust a vehicle control for the tow vehicle based on the critical speed.

DETAILED DESCRIPTION

Figure 1:
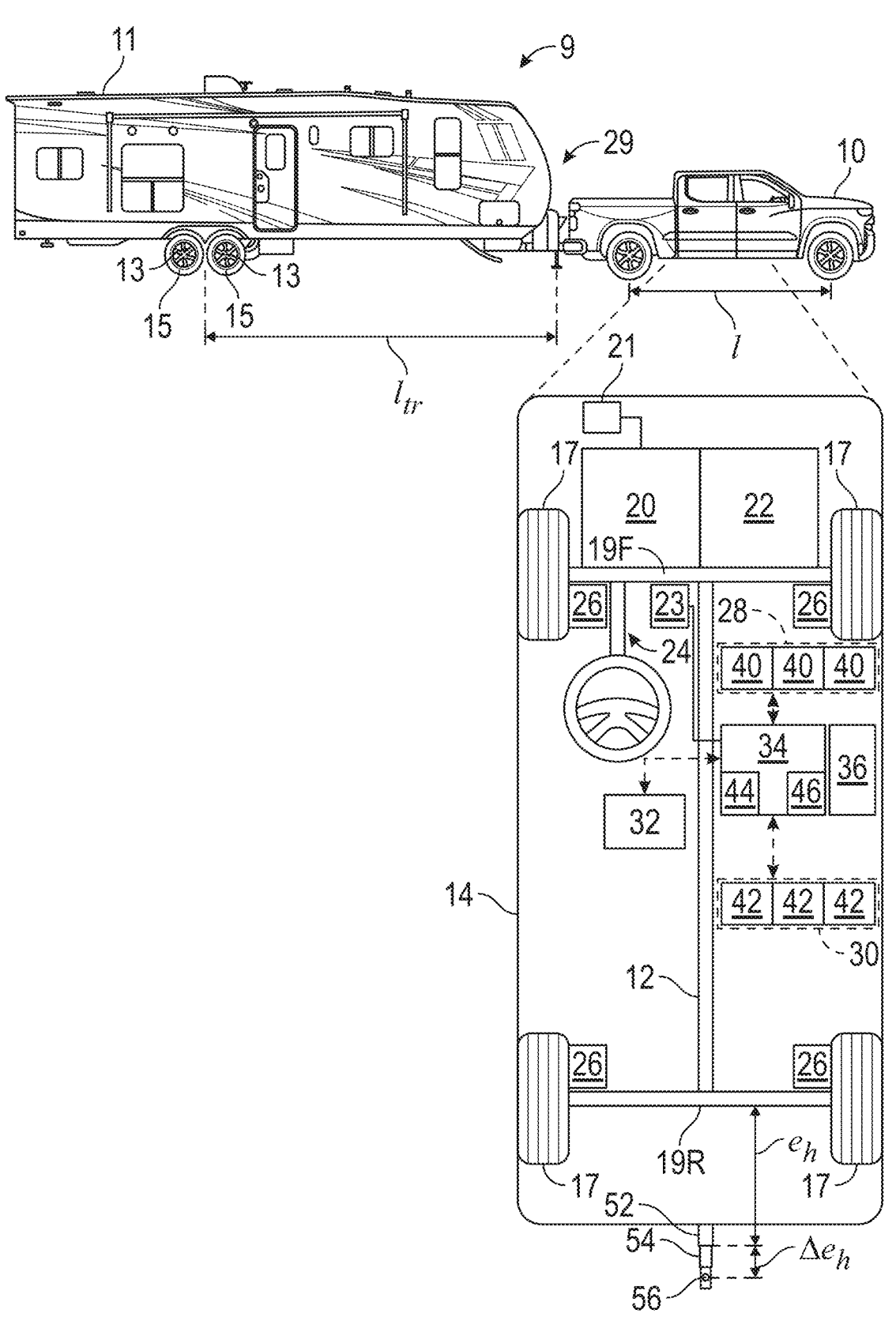
FIG. 1 is a schematic diagram of a vehicle system including a tow vehicle and a trailer.

The present disclosure is susceptible to embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly outlined in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having the potential to perform the specified function after further modification. In other words, the described hardware, when expressly configured to perform the specified function, is specifically selected, created, implemented, utilized, programmed, and/or designed for the purpose of performing the specified function.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

With reference to FIG. 1, the vehicle 10 generally includes a chassis 12, a body 14, front and rear wheels 17. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

In various embodiments, the vehicle 10 may be an autonomous vehicle or a semi-autonomous vehicle. The vehicle 10 is, for example, a vehicle that is automatically controlled to carry passengers from one location to another. The vehicle 10 is depicted in the illustrated embodiment as a pickup truck, but it should be appreciated that other vehicles including sport utility vehicles (SUVs), recreational vehicles (RVs), etc., can also be used.

The vehicle 10 is part of a vehicle system 9. The vehicle system 9 further includes a trailer 11 attached to the vehicle 10. The trailer 11 includes one or more trailer axles 13 each having trailer wheels 15 for supporting the trailer 11.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery pack 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The vehicle wheels 17 are supported by a front axle 19F and a rear axle 19R. The front and rear axles 19F and 19R are separated by a distance 1. The rear axle 19R is spaced from a receiver 52, such as a hitch attachment, by a distance $e_h$ and a trailer connection 56 on a hitch mount 54 is spaced from the receiver 52 by a distance $\Delta e_h$. For purposes of this disclosure, when the trailer 11 includes more than one axle 13, an effective trailer wheelbase $l_{tr}$ is used to represent how the trailer 11 maneuvers. In particular, the effective trailer wheelbase $l_{tr}$ represents an average distance of the axles 13 from the trailer connection 56 or pivot between the trailer 11 and the tow vehicle 10.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more ground penetrating radar (GPR) sensors, one or more global positioning systems (GPS) devices, one or more cameras (e.g., optical cameras and/or thermal cameras, such as a rear camera and/or a front camera), brake pedal position sensor, accelerator pedal position sensor, steering angle sensor, speed sensor, wheel speed sensor, ride height sensors, hitch angle sensor, ultrasonic sensors, one or more inertial measurement units (IMUs), and/or other sensors.

The sensor system 28 includes one or more Global Positioning System (GPS) transceiver configured to detect and monitor the route data (i.e., route information). The GPS device is configured to communicate with a GPS to locate the position of the vehicle 10 in the globe. The GPS device is in electronic communication with the controller 34. Because the sensor system 28 provides data to the controller 34, the sensor system 28 and its sensors 40 are considered sources of information (or simply sources).

The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). For example, the actuator devices 42 include an accelerator pedal, a brake pedal, etc.

The controller 34 includes at least one processor 44 and a non-transitory computer-readable storage device or media 46. The processor 44 can be custom-made or commercially available, a central processing unit (CPU), a graphics processing unit (GPU), an auxiliary processor among several processors associated with the controller 34, a semiconductor-based microprocessor (in the form of a microchip or chip set), a microprocessor, a combination thereof, or generally a device for executing instructions. The computer-readable storage device or media 46 may include volatile and non-volatile storage in read-only memory (ROM), random-access memory (RAM), and keep-alive memory (KAM), for example. KAM is a persistent or nonvolatile memory that may be used to store various operating variables while the processor 44 is powered down. The computer-readable storage device or media 46 may be implemented using several other memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

The vehicle 10 includes a human-machine interface (HMI) 23, which may be a center stack screen or a drive information center. The HMI 23 interacts with a user to show information and receives confirmation, activation, cancellation commands, etc. The HMI 23 may be configured as an alarm, such as a speaker to provide a sound, a haptic feedback in a vehicle seat or other object, a visual display, or other device suitable to provide a notification to the vehicle operator of the vehicle 10. The HMI 23 is in electronic communication with the controller 34 and is configured to receive inputs from a user (e.g., vehicle operator). Accordingly, the controller 34 is configured to receive inputs from the user via the HMI 23. The HMI 23 includes a display configured to display information to the user (e.g., vehicle operator or passenger) and may include one or more speakers to provide an auditable notification to the vehicle operator.

Figure 2:
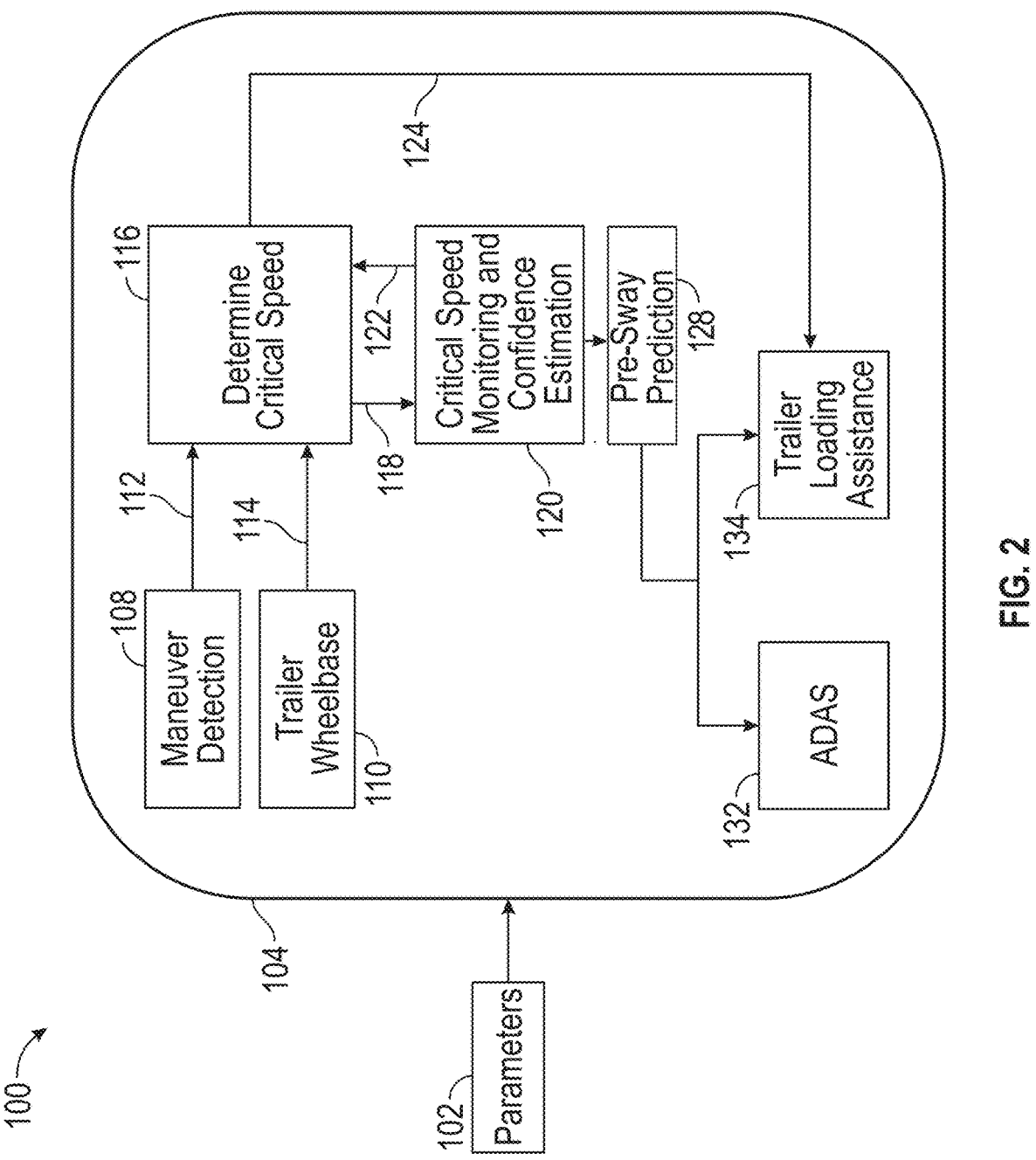
FIG. 2 illustrates an example flow diagram of a method of operating the tow vehicle and trailer of FIG. 1.

FIG. 2 illustrates a flow diagram of the method 100 of operating the vehicle system 9 to manage trailer sway that can occur while the tow vehicle 10 is towing the trailer 9. Trailer sway occurs when the vehicle system 9 reaches a critical velocity where a damping between the trailer 11 and the tow vehicle 10 is no longer able to prevent the trailer 11 from oscillating laterally about the hitch on the tow vehicle 10. When the vehicle system 9 reaches the critical velocity, the damping between the trailer 11 and the tow vehicle is no longer able to prevent sway when an external force acts up the vehicle system 9, such as wind, or the vehicle system 9 enters into a turn.

The method 100 as illustrated in FIG. 2 begins at Block 102 by obtaining parameters related to the operation of the vehicle system 9. In one example, the parameters can include at least one of a hitch angle between the tow vehicle 10 and the trailer 11, a steering angle of the tow vehicle 10, a hitch angle, a velocity of the vehicle assembly 9, a wheel speed for each of the wheels 17 on the tow vehicle 10, an indication that the trailer 11 is connected to the tow vehicle 10, IMU sensor data from at least one of the tow vehicle 10 or the trailer 11, or a GPS location providing roadway information, such as incline. The parameters can also include environmental parameters, such as roughness of the roadway, wind speeds, rain or snow levels, or temperature, as these parameters can influence the vehicle system's 9 interaction with the roadway. The parameters obtained at Block 102 can also include physical parameters of the vehicle system 9 including at least one of a mass of the tow vehicle 10, a mass of the trailer 11 with or without a payload, a wheelbase of the tow vehicle 10, and a hitch location relative to a predetermined location on the tow vehicle.

With the parameters obtained at Block 102, the method 100 proceeds to Block 104 determine an estimated critical speed. In this disclosure, the estimated critical speed of the vehicle system 9 is defined as a speed of the vehicle system 9 where the trailer 11 will begin to oscillate if acted upon by an external force based on a given minimum damping between the trailer 11 and the tow vehicle 10. One feature of this disclosure is that it can estimate a critical speed without knowledge of the dynamics of the trailer 11, such as mass, inertia, or cornering stiffness. Furthermore, this disclosure can estimate critical speed without operating the vehicle system 9 in a manner that introduces oscillations caused by trailer sway.

At Block 104, the method 100 begins estimating the critical speed of the vehicle system 9 based on the parameters obtained from Block 102. At Block 108, the method 100 monitors maneuvers of the vehicle system 9 based on the parameters obtained from Block 102. At Block 108, the method 100 detects a set of parameters that correspond to a predetermine maneuver of the vehicle system 9. The predetermined maneuver includes the parameters used for determining the estimated critical speed for the vehicle system 9 at Block 116. In one example, the predetermined maneuver includes when the vehicle system 9 engages in a turn having at least one of a steering wheel angle of the tow vehicle 10 in excess of a predetermined threshold or a trailer hitch angle in excess of a predetermined threshold.

Additionally, the predetermined maneuver may require a velocity of the vehicle assembly 9 greater than or equal to a predetermined threshold velocity. When the predetermined maneuver has been identified, the parameters corresponding to the predetermined maneuver are sent as outputs 112 to Block 116 to trigger calculating the estimated critical speed.

In addition to the parameters corresponding to the predetermined maneuver from the outputs 112, the method 100 obtains a trailer wheelbase at Block 110. In one example, the trailer wheelbase is entered into the HMI 23 by the driver, or another associated with the vehicle system 9 and provided as an output 114 to Block 116.

In another example, the method 100 performs a trailer wheelbase estimation at Block 110 to obtain the trailer wheelbase needed for the output 114 to Block 116. The trailer wheelbase estimation performed at Block 110 can determine an effective trailer wheelbase for trailers 11 having more than one axle or a location of each axle on a trailer 11. The trailer wheelbase can be calculated relative to a predetermined reference point on the tow vehicle 10, such as the rear axle 19R. Example methods of determining the trailer wheelbase are disclosed in U.S. patent application Ser. No. 18/594,169 entitled "SYSTEM AND METHOD FOR POSITIONING A TOW VEHICLE AND TRAILER" filed Mar. 4, 2024, and in U.S. patent application Ser. No. 18/426,566 entitled "SYSTEM AND METHOD FOR DETERMINING A TRAILER AXLE COUNT AND LOCATION" filed Jan. 30, 2024, with the disclosures hereby incorporated by reference in their entirety.

At Block 116, the method 100 determines the estimated critical speed of the vehicle system 9. In one example, the estimated critical speed is determined by modeling the trailer 11 as a pendulum relative to the tow vehicle 10. EQ. 1 below illustrates one example equation for modeling the trailer 11 as a pendulum relative to the tow vehicle 10.

$$\ddot{\gamma}\left(\frac{I_z + m_t l_{cg}^2}{c_2 l_2}\right) = -\left(\frac{l_2}{v_x}\right)\dot{\gamma} - \gamma - \left(\frac{(l_{cg} + l_r + e_h)m_t l_{cg} + I_z}{c_2 l_2}\right)\dot{\omega}_z - \quad \text{EQ. 1}$$

$$\left(\frac{(l_2 + l_r + e_h)}{v_x}\right)\omega_z + \left(\frac{m_t l_{cg}}{c_2 l_2}\right)a_y + \left(\frac{1}{v_x}\right)v_y$$

In EQ. 1 above, $\gamma$ represents a hitch angle of the tow vehicle, $\omega_z$ represents a yaw rate, $a_y$ represents an acceleration in the y-direction, $v_y$ represents a velocity in the y-direction, $v_x$ represents a velocity in the x-direction, $I_z$ represents a moment of inertia of the trailer 11 with payload, $m_t$ represents a mass of the trailer 11, $l_{cy}$ represents a center of gravity of the trailer, $e_h$ (with a correction $\Delta e_h$ if applicable as shown in FIG. 1) represents a location of the hitch relative to a predetermined location in the vehicle 10, such as the rear axle 19R, $C_2$ represents a total trailer tire cornering stiffness, $l_2$ represents a trailer equivalent wheelbase, and $l_r$ represents a distance from vehicle center of gravity to its rear axle.

By combining various parameters in EQ. 1 as a single gain, and vehicle state variables can be written as a function of hitch angle $\gamma$ and its rate as shown in EQ. 2 below with $\zeta$ representing damping of the trailer 11.

$$\ddot{\gamma}\left(\frac{I_z + m_t l_{cg}^2}{c_2 l_2}\right) + k_\delta \delta + k_{\dot{\delta}} \dot{\delta} = -\left(\frac{l_2}{v_x} + k_d\right)\dot{\gamma} - \gamma \quad \text{EQ. 2}$$

The combinations made above to generate EQ. 2 turn EQ. 2 into a second order system. By taking a Laplace Transform of EQ. 2 and comparing it with a nominal second order system, a natural frequency $\omega_n$ and a damping $\zeta$ can be estimated as shown in EQS. 3-6 below.

$$\ddot{\gamma} + k_\delta \delta + k_{\dot{\delta}} \dot{\delta} = -k_{\dot{\gamma}}\dot{\gamma} - k_\gamma \gamma \rightarrow \boxed{\mathcal{L} \rightarrow \frac{\Gamma(s)}{\Delta(s)} = -\frac{k_\delta + sk_{\dot{\delta}}}{s^2 + k_{\dot{\gamma}}s + k_\gamma}} \quad \text{EQ. 3}$$

$$k_\gamma = \omega_n^2 \quad \text{EQ. 4}$$

$$k_{\dot{\gamma}} = 2\zeta\omega_n \quad \text{EQ. 5}$$

$$k_d = \frac{2\zeta}{\omega_n} - \frac{l_2}{v_x} \quad \text{EQ. 6}$$

By formulating an estimator, such as by utilizing recursive least square, (RLS), $k_\delta$, $k_{\dot{\delta}}$, $k_{\dot{\gamma}}$, $k_\gamma$ can be estimated. By using $k_\gamma$ and $k_{\dot{\gamma}}$ shown in EQS 4 and 5, respectively, the natural frequency $\omega_n$ and current damping $\zeta$ of the vehicle system 9 are estimated. And by utilizing EQ. 7 below, a given minimum damping $\zeta_{min}$, which is a tuning parameter, and critical speed $$v_x^{crt}$$

are estimated.

$$\boxed{v_x^{crt} = \frac{\omega_n l_2}{2\zeta_{min} - \omega_n k_d}} \quad \text{EQ. 7}$$

When the vehicle system 9 is operated on a roadway with an incline, the following derivation shown in EQ. 8 below modifies EQ. 1 to account for grade angle and acceleration or deceleration of the vehicle system 9.

$$\ddot{\gamma}\left(\frac{I_z + m_t l_{cg}^2}{c_2 l_2}\right) = -\left(\frac{l_2}{v_x}\right)\dot{\gamma} - \left(1 - \frac{l_{cg}m_t(g\sin(\theta) + a_x)}{c_2 l_2}\right)\gamma - \quad \text{EQ. 8}$$

$$\left(\frac{(l_{cg} + l_r + e_h)m_t l_{cg} + I_z}{c_2 l_2}\right)\dot{\omega}_z - \left(\frac{(l_2 + l_r + e_h)}{v_x}\right)\omega_z +$$

$$\left(\frac{m_t l_{cg}}{c_2 l_2}\right)a_y + \left(\frac{1}{v_x}\right)v_y$$

In EQ. 8 above, $\theta$ is the grade angle of the roadway and g is the gravitational acceleration. For purposes of simplification, the natural frequency $\omega_n$ can be replaced by a grade based natural frequency $$\omega_n^g$$

as shown in EQ. 9 below.

$$\omega_n^g = \left(1 - G_g \frac{m_t}{l_2}(g\sin(\theta) + a_x)\right)\omega_n \qquad \text{EQ. 9}$$

By combining various parameters in EQ. 8 as a single gain as shown above in EQ. 2, the vehicle state variables can be written as a function of hitch angle and its rate. An estimator can then be used to solve for the grade-based natural frequency $$\omega_n^g$$

and damping $\zeta$ with consideration for grade angle.

By utilizing the above calculations, Block 116 provides calculation of the estimated critical speed as an output 118 and the damping and natural frequency of the vehicle system 9 as an output 124. The outputs 118 and 124 are utilized by the method 100 to further assist in operation of the vehicle system 9.

Figure 3:
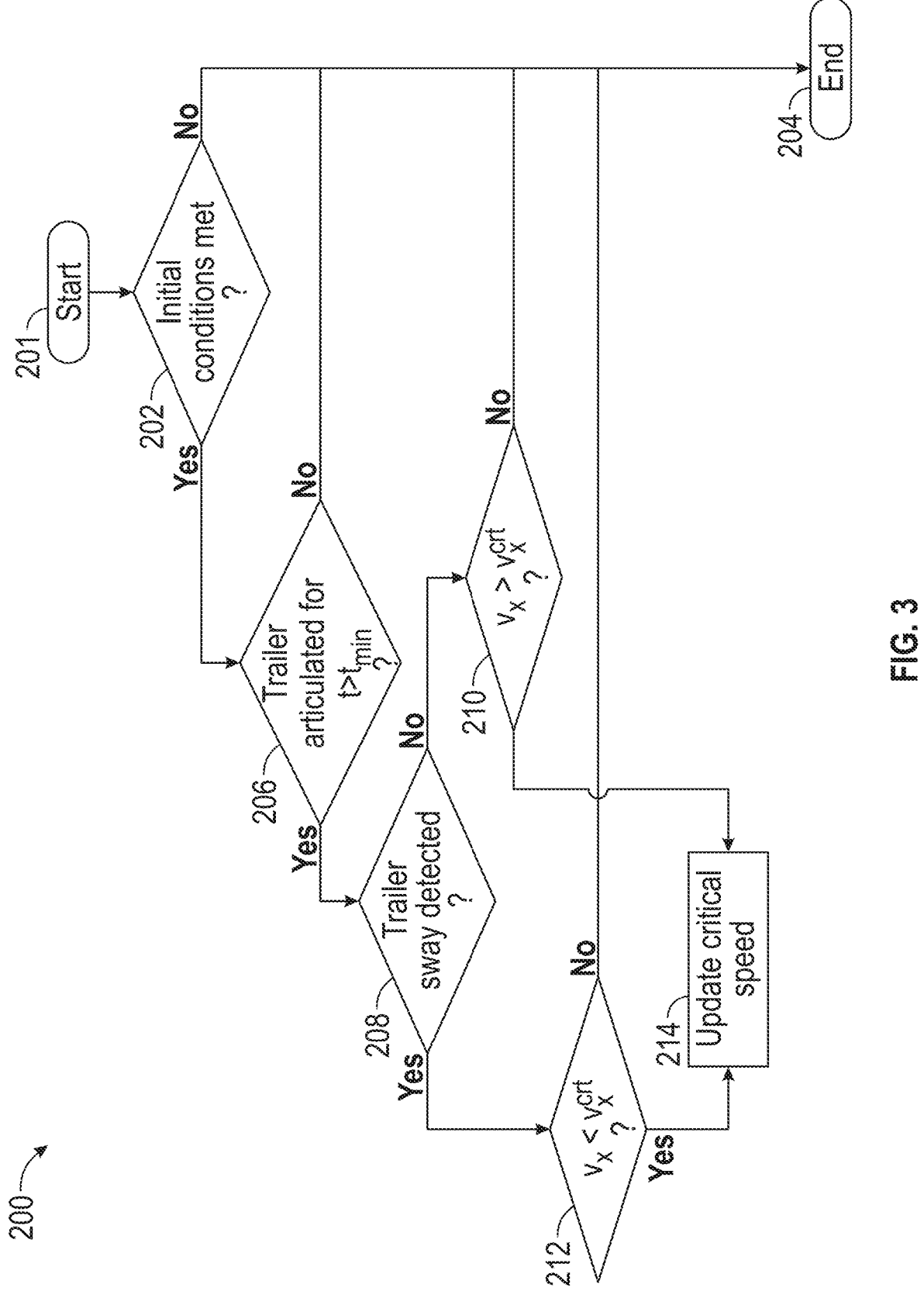
FIG. 3 illustrates an example flow diagram of monitoring and updating a critical speed for the vehicle system.

At Block 120, the method 100 monitors critical speed and determines a confidence level regarding the estimated critical speed from the output 118. FIG. 3 illustrates an example flow diagram of a method 200 of monitoring the critical speed and updating an estimated critical speed $$v_x^{crt}.$$

As shown in FIG. 3, the method 200 begins at Block 201 and proceeds to Block 202 At Block 202, the method 200 determines if initial conditions are met. In one example, the initial conditions can include at least one of a velocity greater than a predetermined velocity, if the trailer 11 is connected to the tow vehicle 10, the estimated critical speed $$v_x^{crt}$$

from the output 118, a trailer articulation angle, or a determination if trailer sway observer(s) are available. In this disclosure, the trailer articulation angle and trailer sway observers can be determined by at least one of cameras or sensors on the vehicle 10, such as rear view cameras or IMU(s). If one or more of the initial conditions are not met at Block 202, the method 200 proceeds to Block 204 and ends. If one or more of the initial conditions from Block 202 are met, the method 200 proceeds to Block 206.

At Block 206, the method 200 determines if the trailer 11 is articulated at an angle that is greater than a minimum articulation angle for a time t that is greater than a minimum time $t_{min}$. If the trailer 11 is not articulated above a minimum articulation angle for a time t greater than the minimum time $t_{min}$, the method proceeds to Block 204 and ends. If the trailer articulation angle is above the predetermined articulation angle for a time greater than $t_{min}$, the method 200 proceeds to Block 208.

At Block 208, the method 200 determines if trailer sway is detected within a predetermined time frame $t_{window}$ after the requirements of Block 206 were satisfied as described above. If trailer sway is not detected within the time frame $t_{window}$, the method 200 proceeds to Block 210. At Block

210, the method 200 determines if the current vehicle speed $v_x$ is greater than the estimated critical speed $$v_x^{crt}.$$

If the current vehicle speed $v_x$ is not greater than the estimated critical speed $$v_x^{crt},$$

the method 200 proceeds to Block 204 and ends. If the current vehicle speed $v_x$ is greater than the estimated critical speed $$v_x^{crt},$$

the method 200 proceeds to Block 214. At Block 214, the method 200 determines an updated critical speed $$v_x^{\mu\_crt}$$

based on the current vehicle speed $v_x$ with EQ. 10 below. The updated critical speed $$v_x^{\mu\_crt}$$

will then be used as the estimated critical speed $$v_x^{crt}$$

for the calculations disclosed below.

$$v_x^{\mu\_crt} = -\alpha(v_x^{crt} - v_x) + v_x^{crt} \qquad \text{EQ. 10}$$

In EQ. 10 above, $\alpha$ is a function of critical speed confidence. In one example, $\alpha$ could have a value of 0.50 representing a high degree of confidence in the current vehicle speed $v_x$ providing a more accurate estimated critical speed $$v_x^{crt}.$$

In another example, a could have a value up to 1.0 representing a highly speculative confidence level in the current vehicle speed $v_x$ providing a more accurate estimated critical speed $$v_x^{crt}.$$

If trailer sway is detected within the time frame $t_{window}$ at Block 208, the method 200 proceeds to Block 212. At Block 212, the method 200 determines if the current vehicle speed $v_x$ is less than the estimated critical speed $$v_x^{crt}.$$

If the current vehicle speed vis not less than the estimated critical speed $$v_x^{crt},$$

the method 200 proceeds to Block 204 and ends. If the current vehicle speed $v_x$ is less than the estimated critical speed $$v_x^{crt},$$

the method 200 proceeds to Block 214. At Block 214, the method 200 utilizes EQ. 10 as discussed above to determine the updated critical speed $$v_x^{\mu\_crt}.$$

When the method 200 reaches Block 214 from Block 212, this represents a situation where the estimated critical speed $$v_x^{crt}$$

was greater than a speed with trailer sway detected.
If the estimated critical speed $$v_x^{crt}$$

was updated at Block 120 as determined by the method 200, the updated critical speed $$v_x^{\mu\_crt}$$

can be utilized as an output 122 to update the minimum damping $\zeta_{min}$ in Block 116. Block 120 can also generate an output that includes the estimated critical speed $$v_x^{crt}$$

or the updated critical speed $$v_x^{\mu\_crt}$$

if one was determined by the method 200. The output is sent to Block 128 to display to the operator of the tow vehicle 10 on the HMI 23 and then onto Block 132 for use with advanced driver assistance systems (ADAS) (if available) and to Block 134 to provide trailer loading assistance.

Figure 4:
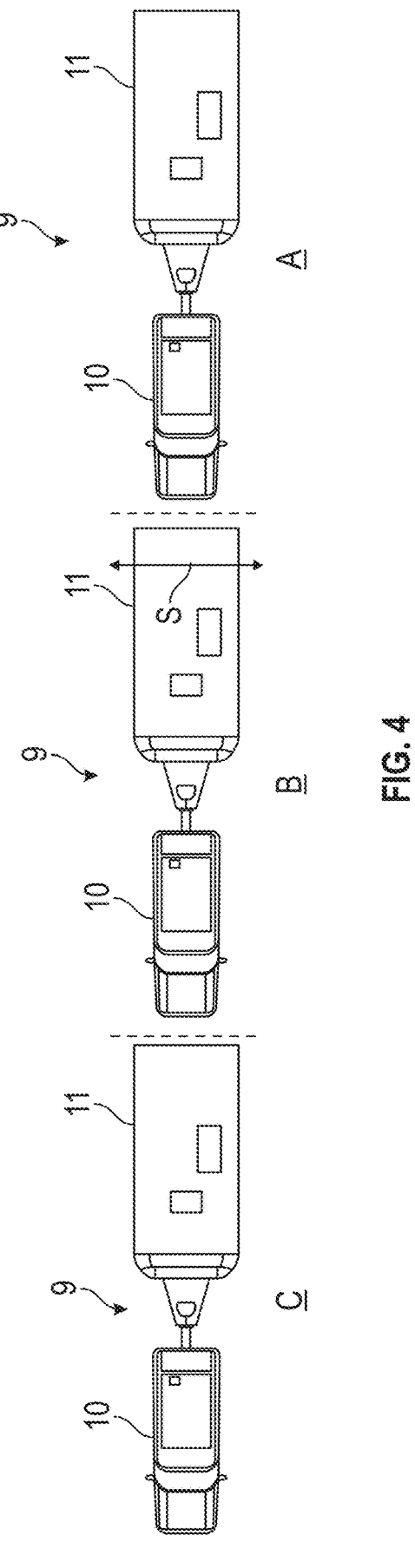
FIG. 4 illustrates an example schematic of determining the critical speed, thus preventing the sway of the trailer relative to the tow vehicle of FIG. 1 under multiple operating scenarios.

At Block 132, the method 100 can utilize the value of critical speed provided from Block 120, $$v_x^{\mu\_crt} \text{ or } v_x^{crt},$$

to prevent developing trailer sway with the vehicle system 9. FIG. 4 schematically illustrates how the vehicle system 9 can encounter trailer sway and how the method 100 can be utilized to prevent or eliminate trailer sway. As shown in FIG. 4, when the vehicle system 9 is operating at a speed less than the critical speed as shown by region A, the trailer 11 does not sway when acted upon by an external force as explained above.

Without this disclosure, if the driver of the tow vehicle 10 continues to increase the speed of the vehicle system 9 in region B of FIG. 4 until the vehicle speed exceeds the critical speed and is acted upon by an outside force, the trailer 11 will begin to sway or oscillate in direction S relative to the tow vehicle 10. The driver will then need to regain control of the vehicle system 9 to eliminate the trailer sway to allow the vehicle system 9 to continue operating without trailer sway in as shown in region C of FIG. 4. To aid the driver, the tow vehicle 10 can utilize vehicle control, such as anti-sway control measures, including one or more of applying trailer brakes, utilizing dynamic brake control on the tow vehicle 10, or applying corrective steering measures through the actuator system 30 in connection with the steering system 24. These anti-sway measures can be applied until the trailer 11 has stopped swaying as shown in region C of FIG. 4.

In one example, if the tow vehicle 10 is being operated manually by the driver, the method 100 can display to the driver, such as on the HMI 23, the estimated critical speed $$v_x^{crt}$$

to aid the driver operating the vehicle system 9 to avoid trailer sway that can occur as shown in region B of FIG. 4. The method 100 can provide an alert to the driver of the tow vehicle if the tow vehicle comes within a predetermined percentage or range of the estimated critical speed $$v_x^{crt},$$

such as within 90% or within 95% of the critical speed $$v_x^{crt}$$

or within 5 mph (8 kph) of the estimated critical speed $$v_x^{crt}.$$

The alert provided can be audible, visual, or haptic, such as through the steering wheel or driver's seat.

If the driver of the vehicle system 9 is utilizing the ADAS, such as adaptive cruise control, the critical speed with be displayed and the ADAS can limit the speed of the vehicle system 9 to be below the estimated critical speed $$v_x^{crt}.$$

The ADAS can also limit the speed of the vehicle system 9 to be within a predetermined percentage of the estimated critical speed, such as within 90% or within 95% of the estimated critical speed $$v_x^{crt}.$$

This allows the vehicle system 9 utilizing the method 100 to avoid the region B shown in FIG. 4 and prevent trailer sway from developing. The ADAS can also adjust a following distance for the adaptive cruise control for the tow vehicle 10 based on a speed of the tow vehicle and the critical speed. EQ. 11 below provides an example adjusted following distance $d_s$ based on a current following distance $d_o$, a constant G, critical speed $$v_x^{crt},$$

and the velocity $v_x$ of the tow vehicle 10.

$$d_s = d_o + G\left(1 - \frac{v_x^{crt} - v_x}{v_x^{crt}}\right) \qquad \text{EQ. 11}$$

When the driver is operating the tow vehicle 10, the driver may want to operate the vehicle system 9 at a speed greater than the critical speed recommended by the method 100. The method 100 may also provide feedback to the driver that can increase the estimated critical speed for the vehicle system 9. In one example, the method 100 can provide feedback to the driver by providing trailer loading assistance at Block 134.

Figure 5:
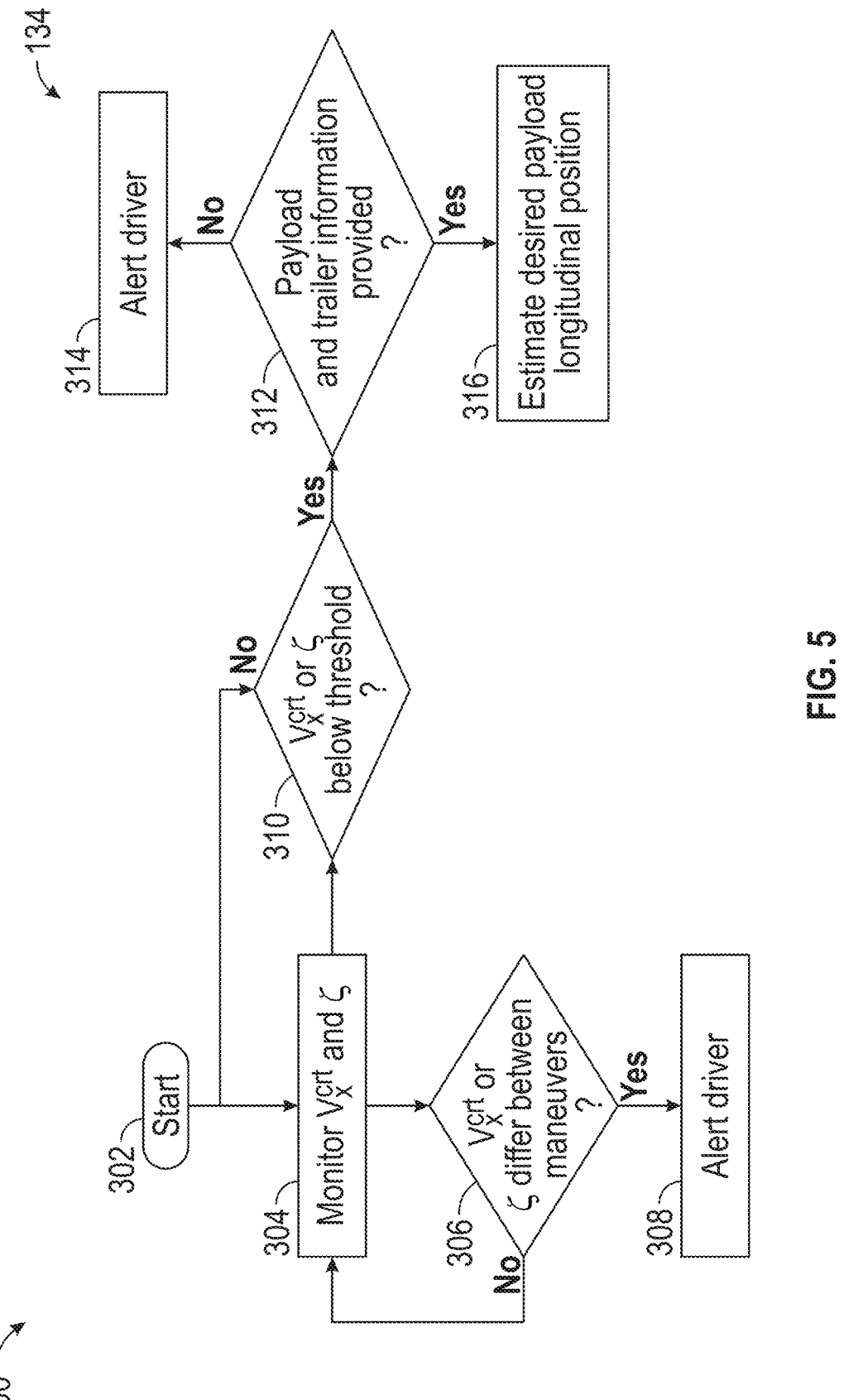
FIG. 5 illustrates an example flow diagram for determining placement of a payload on the trailer of FIG. 1 to improve vehicle dynamics and alerting a driver to improvements in payload positioning.

FIG. 5 illustrates an example flow diagram of a method 300 of providing trailer loading assistance from Block 134. The method 300 begins at Block 302 and proceeds to Block 304 to monitor the critical speed $$v_x^{crt}$$

and damping $\zeta$ of the vehicle system 9. Variations in the critical speed $$v_x^{crt}$$

and damping (are monitored for driving conditions when the vehicle system 9 is traveling along straight roadway sections as well as along curved roadway sections having left and right maneuvers. If the method 300 determines that the vehicle system 9 is traveling along a curved roadway, the method 300 proceeds to Block 306.

At Block 306, the method 300 compares the critical speed $$v_x^{crt}$$

and damping (for sections of the roadway where the vehicle system 9 is following a left turn maneuver versus sections of the roadway where the vehicle system 9 is following a right turn maneuver. If the method 300 determines that the critical speed $$v_x^{crt}$$

or damping (between the left or right maneuvers differ beyond a predetermined threshold, the method proceeds to Block 308. At Block 308, the method 300 provides an alert to the driver of a possible lateral loading condition for the trailer 11 that may be causing the difference in critical speed $$v_x^{crt}$$

and damping $\zeta$ determined. In one example, the lateral loading imbalance can be due to a payload not being centered on the trailer 11. The driver can then choose to adjust the payload on the trailer 11 or to leave the payload unchanged. If the payload is redistributed more evenly in a lateral direction, this can increase the critical speed $$v_x^{crt}$$

and damping $\zeta$ of the vehicle system 9.

If at Block 306, it is determined that the critical speed $$v_x^{crt}$$

or damping $\zeta$ between left and right turns do not differ by a predetermined threshold, the method 300 will return to Block 304. Simultaneously, Block 304 also monitors the critical speed $$v_x^{crt}$$

and damping $\zeta$. If the critical speed $$v_x^{crt}$$

or damping $\zeta$ are below a predetermined threshold value as determined by Block 310, the method 300 proceeds to Block 312.

At Block 312, the method 300 determines if payload and trailer information are available. If the method 300 determines that the payload and trailer information are not available, the method 300 proceeds to Block 314 and issues an alert to the driver that the trailer 11 may have a longitudinal loading condition. A longitudinal loading condition can indicate that the payload on the trailer 11 is not optimally positioned to maximize critical speed or damping $\zeta$.

If the method 300 has obtained payload and trailer information as determined at Block 312, the method 300 proceeds to Block 316 to estimate a desired payload longitudinal position that will improve at least one of the critical speed $$v_x^{crt}$$

or damping (of the vehicle system 9. In one example, the payload and trailer information are provided to the method 300 by the driver, such as through the HMI 23.

In one example, the payload and trailer information can include at least one of a mass of the trailer 11 and the payload, a center of gravity of the payload and the trailer 11, length of the trailer 11 and the payload, a moment of inertia of the trailer 11 and payload, a moment of inertia of the trailer 11 and payload combined, a width of each of the trailer 11 and payload, a combined center of gravity of the trailer 11 and payload, a center of gravity of for the trailer 11 and payload separately, or additional parameters discussed below with respect to EQS. 11-18.

The EQS. listed below represent a single example implementation of this disclosure. Utilizing EQS. 12-13 below, an estimated natural frequency $\omega_{n,est}$ of the vehicle system 9 can be related to a desired natural frequency $\omega_{n,des}$ of the vehicle system 9.

$$\omega_{n,est} = \sqrt{\frac{C_2 l_2}{\left(I_z + (m_t + m_p)l_{cg}^2\right)_{est}}} \qquad \text{EQ. 12}$$

$$\omega_{n,des} = \frac{2\zeta_{min}}{\frac{l_2}{v_{x,des}^{crt}} + k_d} = \sqrt{\frac{C_2 l_2}{\left(I_z + (m_t + m_p)l_{cg}^2\right)_{des}}} \qquad \text{EQ. 13}$$

In EQS 12-13 above, $C_2$ is a total trailer tire cornering stiffness, $l_2$ is a trailer equivalent wheelbase, $I_z$ is a moment of inertia of the trailer 11 and the payload combined, $l_{cg}$ is a longitudinal position of the center of gravity of the trailer and payload combined, $\zeta_{min}$ is a desired minimum damping of the vehicle system 9, $m_p$ is a mass of the payload, $m_t$ is a mass of the trailer 11, $$v_{x,des}^{crt}$$

is the desired critical speed for the vehicle system 9, and $k_d$ is provided in EQ. 6 above.

For simplicity, EQ. 14 is represented as a single equation for the moment of inertia of the payload $I_p$ and the moment of inertia of the trailer $I_t$. The equations utilize a mass of the payload/trailer $m_{p/t}$, a length of payload/trailer $l_{p/t}$, and width of payload/trailer $w_{p/t}$, respectively.

$$I_{p/t} \cong \frac{1}{12} m_{p/t}\left(l_{p/t}^2 + w_{p/t}^2\right) \qquad \text{EQ. 14}$$

With the moment of inertia of the payload $I_p$ and the moment of inertia of the trailer $I_t$ calculated from EQ. 14, the moment of inertia $I_z$ of the combined trailer and payload can be calculated from EQ. 15.

$$I_z = I_t + m_t(l_{cg} - l_{cg,t})^2 + I_p + m_p(l_{cg} - l_{cg,p})^2 \qquad \text{EQ. 15}$$

In EQ. 15 above, $l_{cg}$ is the center of gravity of the combined trailer and payload, $l_{cg,t}$ is the center of gravity of the trailer, and $l_{cg,p}$ is the center of gravity of the payload. EQS. 16-17 below can be utilized to calculate the center of gravity of the trailer 11 and the combined center of gravity if needed.

$$l_{cg,t} \cong l_t/2 \qquad \text{EQ. 16}$$

$$l_{cg} = \frac{m_t l_{cg,t} + m_p l_{cg,p}}{m_t + m_p} \qquad \text{EQ. 17}$$

Utilizing EQS. 13-17 above in connection with EQS. 18-19 below, a change in longitudinal position center of a gravity of the payload $\Delta l_{cg,p}$ can be determined from the difference between the desired longitudinal position of the center of gravity of the payload $l_{cg,p,des}$ and the estimated longitudinal position of the center of gravity of payload $l_{cg,p,est}$.

$$\left(I_z + (m_t + m_p)l_{cg}^2\right)_{des} = \left(I_z + (m_t + m_p)l_{cg}^2\right)_{est} * \frac{\omega_{n,est}^2}{\omega_{n,des}^2} \qquad \text{EQ. 18}$$

EQ. 17 then yields a change in longitudinal position of the center of gravity of the payload $\Delta l_{cg,p}$ as shown in EQ. 18.

$$\xrightarrow{yields} l_{cg,p,des} - l_{cg,p,est} = \Delta l_{cg,p} \qquad \text{EQ. 19}$$

The change in longitudinal position of the center of gravity of the payload $\Delta l_{cg,p}$ can then be output to the driver of the tow vehicle 10 to provide guidance in a direction and magnitude for adjusting payload. This adjustment to the payload can improve the critical speed $$v_x^{crt}$$

and damping $\zeta$ of the vehicle system 9.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in a suitable manner in the various aspects.

When an element such as a layer, film, region, or substrate is referred to as being "on" another element, it can be directly on the other element, or intervening elements may also be present. In contrast, when an element is referred to as being "directly on" another element, there are no intervening elements present.

Unless specified to the contrary herein, test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure not be limited to the particular embodiments disclosed but will include embodiments falling within the scope thereof.

What is claimed is:

1. A method of operating a tow vehicle and a trailer to prevent trailer sway, the method comprising:
    detecting a predetermined maneuver for the tow vehicle and the trailer based on a plurality of operating parameters, wherein the predetermined maneuver corresponds to a subset of operating parameters from the plurality of operating parameters;
    determining a critical speed based on the subset of operating parameters, wherein the critical speed corresponds to a speed of the tow vehicle and trailer where a damping between the tow vehicle and the trailer cannot prevent trailer sway;
    calculating a first estimated critical speed and a first damping between the tow vehicle and the trailer based on a first predetermined lateral maneuver of the tow vehicle including a first steering angle above a predetermined threshold in a first direction;
    calculating a second estimated critical speed and a second damping between the tow vehicle and the trailer based on a second predetermined lateral maneuver of the tow vehicle including a second steering angle above a second predetermined threshold in a second direction opposite the first direction;
    determining if a critical speed variation between the first estimated critical speed and the second estimated critical speed exceeds a predetermined threshold;
    determining if a damping variation between the first damping and the second damping exceeds a predetermined threshold; and
    adjusting a vehicle control for the tow vehicle based on the critical speed and alerting an operator of the tow vehicle to a lateral load imbalance if at least one of the critical speed variation exceeds the predetermined threshold or the damping variation drops below the predetermined threshold.

2. The method of claim 1, wherein adjusting the vehicle control for the tow vehicle includes operating the tow vehicle at an operating speed less than the critical speed.

3. The method of claim 2, wherein operating the tow vehicle at a speed less than the critical speed includes limiting a speed for an adaptive cruise control system on the tow vehicle.

4. The method of claim 1, wherein adjusting the vehicle control for the tow vehicle includes varying a spacing between the tow vehicle and another vehicle on a roadway based on the critical speed.

5. The method of claim 1, including displaying the critical speed to an operator of the tow vehicle.

6. The method of claim 5, including alerting to the operator of the tow vehicle if a tow vehicle speed is within a predetermined range of the critical speed.

7. The method of claim 1, wherein the predetermined maneuver includes a steering angle of the tow vehicle more than a predetermined threshold angle and determining the critical speed is based at least partially on a trailer wheelbase.

8. The method of claim 7, wherein the predetermined maneuver includes the tow vehicle and the trailer operating above a predetermined threshold speed for a predetermined length of time.

9. The method of claim 1, wherein the subset of operating parameters includes a road grade of a roadway and determining the critical speed is based on the road grade of the roadway.

10. The method of claim 1, including:
    calculating a trailer damping for the trailer relative to the tow vehicle;
    determining if the trailer damping is below a predetermined damping threshold or the critical speed is above a predetermined critical speed;
    alerting an operator of the tow vehicle of a longitudinal trailer payload imbalance if at least one of the trailer damping is below a predetermined damping threshold or the critical speed is above a predetermined critical speed; and
    providing a longitudinal payload adjustment recommendation.

11. A non-transitory computer-readable storage medium embodying programmed instructions which, when executed by a processor, are operable for performing a method comprising:
    detecting a predetermined maneuver for a tow vehicle and a trailer based on a plurality of operating parameters, wherein the predetermined maneuver corresponds to a subset of operating parameters from the plurality of operating parameters;
    determining a critical speed based on the subset of operating parameters, wherein the critical speed corresponds to a speed of the tow vehicle and trailer where a damping between the tow vehicle and the trailer cannot prevent trailer sway;
    calculating a trailer damping for the trailer relative to the tow vehicle;
    determining if the trailer damping is below a predetermined damping threshold or the critical speed is above a predetermined critical speed;
    alerting an operator of the tow vehicle of a longitudinal trailer payload imbalance if at least one of the trailer damping is below a predetermined damping threshold or the critical speed is above a predetermined critical speed; and
    adjusting a vehicle control for the tow vehicle based on the critical speed and providing a longitudinal payload adjustment recommendation.

12. The non-transitory computer-readable storage medium of claim 11, wherein adjusting the vehicle control for the tow vehicle includes operating the tow vehicle at an operating speed less than the critical speed.

13. The non-transitory computer-readable storage medium of claim 11, wherein the method includes displaying the critical speed to an operator the tow vehicle.

14. The non-transitory computer-readable storage medium of claim 13, wherein the method includes alerting to the operator of the tow vehicle if a tow vehicle speed is within a predetermined range of the critical speed.

15. The non-transitory computer-readable storage medium of claim 13, wherein the subset of operating parameters includes a road grade of a roadway and determining the critical speed is based on the road grade of the roadway.

16. The non-transitory computer-readable storage medium of claim 11, wherein the method includes:

calculating a first estimated critical speed and a first damping between the tow vehicle and the trailer based on a first predetermined lateral maneuver of the tow vehicle including a first steering angle above a predetermined threshold in a first direction;

calculating a second estimated critical speed and a second damping between the tow vehicle and the trailer based on a second predetermined lateral maneuver of the tow vehicle including a second steering angle above a second predetermined threshold in a second direction opposite the first direction;

determining if a critical speed variation between the first estimated critical speed and the second estimated critical speed exceeds a predetermined threshold;

determining if a damping variation between the first damping exceeded and the second damping exceeds a predetermined threshold; and alerting an operator of the tow vehicle to a lateral load imbalance if at least one of the critical speed variation exceeds the predetermined threshold or the damping variation drops below the predetermined threshold.

17. A vehicle comprising:

a body defining a passenger compartment;

a plurality of wheels supporting the body;

a plurality of sensors fixed relative to the body; and a controller in communication with the plurality of sensors, the controller being configured to:

detect a predetermined maneuver for a tow vehicle and a trailer based on a plurality of operating parameters, wherein the predetermined maneuver correspond to a subset of operating parameters from the plurality of operating parameters;

determine a critical speed based on the subset of operating parameters, wherein the critical speed corresponds to a speed of the tow vehicle and trailer where a damping between the tow vehicle and the trailer cannot prevent trailer sway;

calculate a first estimated critical speed and a first damping between the tow vehicle and the trailer based on a first predetermined lateral maneuver of the tow vehicle including a first steering angle above a predetermined threshold in a first direction;

calculate a second estimated critical speed and a second damping between the tow vehicle and the trailer based on a second predetermined lateral maneuver of the tow vehicle including a second steering angle above a second predetermined threshold in a second direction opposite the first direction, determine if a critical speed variation between the first estimated critical speed and the second estimated critical speed exceeds a predetermined threshold;

determine if a damping variation between the first damping exceeded and the second damping exceeds a predetermined threshold; and adjust a vehicle control for the tow vehicle based on the critical speed and alert an operator of the tow vehicle to a lateral load imbalance if at least one of the critical speed variation exceeds the predetermined threshold or the damping variation drops below the predetermined threshold.

18. The vehicle of claim 17, wherein adjusting the vehicle control for the tow vehicle includes operating the tow vehicle at an operating speed less than the critical speed.

19. The vehicle of claim 17, wherein the controller is configured to:

calculate a trailer damping for the trailer relative to the tow vehicle;

determine if the trailer damping is below a predetermined damping threshold or the critical speed is above a predetermined critical speed;

alert an operator of the tow vehicle of a longitudinal trailer payload imbalance if at least one of the trailer damping is below a predetermined damping threshold or the critical speed is above a predetermined critical speed; and provide a longitudinal payload adjustment recommendation.

20. The vehicle of claim 17, wherein the controller is configured to adjust the vehicle control for the tow vehicle by operating the tow vehicle at an operating speed less than the critical speed.

\* \* \* \* \*